United States Patent [19]

Santis et al.

[11] 4,223,363
[45] Sep. 16, 1980

[54] AUTOMOTIVE VOLTAGE REGULATOR SYSTEM

[75] Inventors: Dean C. Santis, Winfield; Kirk Sievers, Roselle, both of Ill.

[73] Assignee: Motorola, Inc., Schaumburg, Ill.

[21] Appl. No.: 963,250

[22] Filed: Nov. 24, 1978

[51] Int. Cl.³ .............................................. H02H 7/06
[52] U.S. Cl. ........................................ 361/18; 322/28
[58] Field of Search ...................... 361/18, 56; 322/28; 320/61, 64, 68

[56] References Cited

U.S. PATENT DOCUMENTS

| 3,586,957 | 6/1971 | Cass | 361/56 X |
| 3,934,175 | 1/1976 | Clark | 361/56 |

FOREIGN PATENT DOCUMENTS 595840 2/1978 U.S.S.R. ...................................... 322/28

Primary Examiner—Harry E. Moose, Jr.
Attorney, Agent, or Firm—James W. Gillman; James S. Pristelski

[57] ABSTRACT

An automotive battery charging system having a voltage regulator circuit with an improved feedback network for controlling the duty cycle and frequency of current in the field coil of the alternator. The feedback network includes a filtering circuit to minimize the effect of voltage spikes and ripple on feedback current. The filtering circuit is in the form of a variety of networks for clamping filtering and regulating.

10 Claims, 9 Drawing Figures

AUTOMOTIVE VOLTAGE REGULATOR SYSTEM

BACKGROUND OF THE INVENTION

This invention relates to an improved automotive voltage regulator system and, in particular, to isolation of the feedback network from spikes from diode commutation and voltage ripples from the alternator.

It is known to provide overvoltage protection circuits in automotive battery charging systems including a voltage regulator so as to prevent damage to voltage regulator components as described, for example, in U.S. Pat. No. 3,723,817 to Leonard, et al., U.S. Pat. No. 3,938,005 to Cummins, and U.S. Pat. No. 4,040,115 to Gruson. While these circuits are intended to protect transistor switches against voltage surge, they provide no benefit in isolating a positive feedback network from spikes due to diode commutation and voltage ripple from alternator current.

A feedback network associated with a voltage regulator provides current necessary for regulator switching. Feedback circuits are known as indicated for example, by U.S. Pat. No. 3,740,637. It has been found that spikes due to diode commutation and large ripple voltages at the alternator output terminals can cause feedback current to fluctuate which, in turn, causes improper switching of the regulator system resulting in damage to the battery. This is especially so in the case of large alternators and small batteries and/or long harnesses.

SUMMARY OF THE INVENTION

In the instant invention, the feedback network of the voltage regulator is isolated from spikes and ripples to effect proper switching thereof in response to sensing line voltage as opposed to sensing of spikes and ripple transients at the alternator output terminals.

It is therefore the primary object of the invention to improve automotive voltage regulator systems.

It is a further object of the present invention to isolate the feedback network in an automotive voltage regulator system from spikes and ripple.

It is a further object of the present invention to filter spikes and ripple from a feedback network of a voltage regulator.

BRIEF DESCRIPTION OF THE DRAWINGS

The above objects as well as others will become more apparent with an understanding of the following specifications which is to be read in conjunction with the accompanying drawings in which.

DETAILED DESCRIPTION OF THE INVENTION

Figure 1:
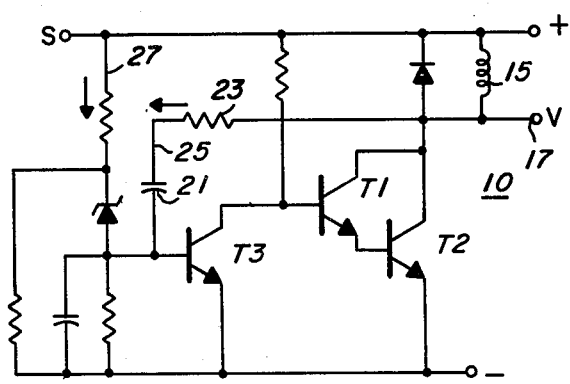
FIG. 1 is a schematic circuit diagram of a voltage regulator system according to the prior art.

FIG. 1 shows a regulator circuit 10 according to the prior art for regulating the changing voltage of a three phase automotive battery charging system. The battery (not shown) is connected across positive output terminal (+) and negative output terminal (−). The regulator circuit supplies current to a field coil 15 connected across the positive terminal and a field terminal 17 to excite a three phase alternator (not shown). The desired field current is determined by sensing voltage at terminal S which voltage controls the duty cycle and frequency of an oscillator comprising Darlington transistor pair T1 and T2 and transistor T3 and a feedback network which includes capacitor 21 and resistor 23. If field current is increasing and Darlington transistors T1 and T2 are ON, then voltage at terminal 5 is increasing and subsequently transistor T3 will turn ON. As a result, Darlington transistor T1 and T2 will turn OFF causing voltage at terminal 17 to increase rapidly. When this occurs current 25 in feedback network increases turning transistor T3 on harder or to go deeper into saturation. At this time the field current is decreasing and voltage at terminal S is decreasing. Subsequently, feedback current 25 decreases exponentially and current 27 from sensing terminal S similarly decreases. When currents are sufficiently small, transistor T3 will turn OFF causing Darlington transistors T1 and T2 to turn ON. When this occurs, the field current will increase causing the charging voltage and sensing voltage to increase and the aforementioned cycle to repeat.

Figure 2:
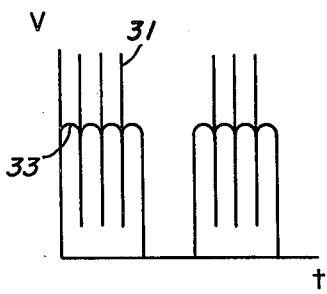
FIG. 2 is graph illustrating the effect of spikes and voltage ripple on field voltage.
Figure 3:
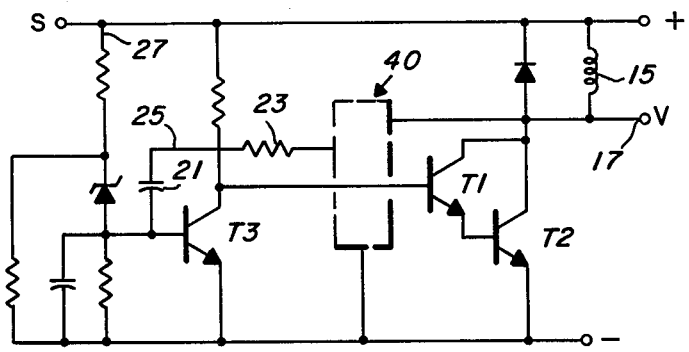
FIG. 3 is a schematic circuit diagram of an improved voltage regulator system according to the present invention.

It will be noted that spikes from diode commutation and voltage from three phase alternator current ripple are present during normal alternator operation. FIG. 2 illustrates the spikes 31 and ripple 33 according to field voltage V and time. A problem resulting from this is that current 25 in the feedback network is influenced thereby causing improper switching of Darlington transistors T1 and T2 and transistor T3. More specifically, feedback current 25 which is normally exponentially decaying to produce the required duty cycle and frequency is now abruptly changing due to the voltage spikes and ripple. As a result the regulator is unable to control the battery charging system voltage as required. Thus, damage to the battery and electrical system may occur.

In accordance with the instant invention a filter circuit 40 is provided to isolate the feedback network from the spurious ripple voltages and spikes present during normal alternator operation. The filter circuit couples the feedback network to field terminal 17.

FIGS. 4 (a)-(f) illustrate different embodiments of the filter circuit of the invention. In FIG. 4(a) the filter circuit is preferably in the form of a Zener diode 41 its cathode connected to resistor 43. By this structure positive going voltage ripple and spikes are clamped and therefore do not effect feedback current 25. In FIG. 4(b), the filter circuit includes Zener diode 41 and resistor 43 and also a capacitor 45. Capacitor additionally minimizes the effect of negative voltage ripples and spikes. FIG. 4(c) uses capacitor 45 and resistor 43 as a simplified low pass filtering circuit.

Figure 4A:
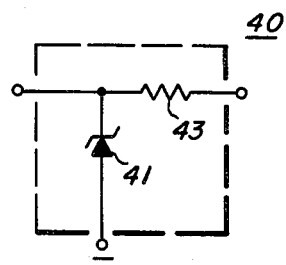
FIGS. 4(a)-(f) illustrate different embodiments of the filtering circuit of the invention.
Figure 4B:
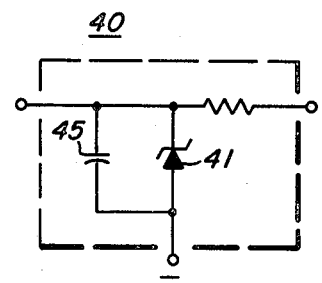
Figure 4C:
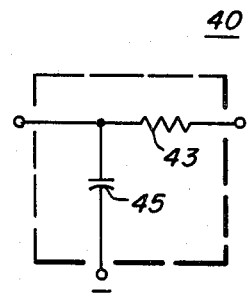
Figure 4D:
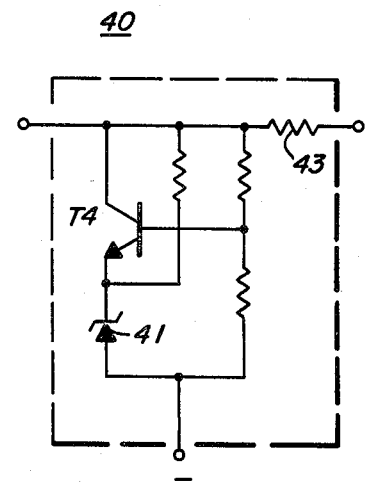
Figure 4E:
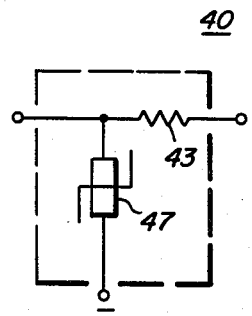
Figure 4F:
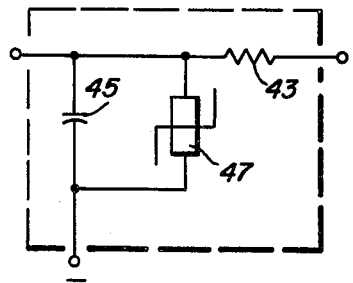

In FIG. 4(d) a regulator circuit is used in which the emitter of transistor T4 is coupled to Zener diode 41. By this structure both positive and negative going voltage spikes and ripples are minimized. In FIGS. 4(e) and 4(f) a metal oxide varistor 47 is substituted in place of the Zener diode and in FIG. 4(f) the capacitor 45 is added to function in the manner described above.

It will now be appreciated that by virtue of the filtering of voltage ripples and spikes from the feedback network of the regulator circuit during normal alternator operation that the performance of the voltage regulator system is much improved. Furthermore, damage to the battery is averted. It will be understood that other modifications and substitutions may be made to the invention without departing from the spirit of the invention which is to be limited only within the scope of the appended claims.

We claim:

1. An automotive battery charging system having a voltage regulator circuit with an improved feedback network comprising:

first circuit means for sensing voltage across a battery and generating a DC current in a field coil of an alternator charging system, second circuit means including switching means and a feedback network for controlling the duty cycle and frequency of current in said field coil by switching in response to the voltage of said first circuit means, filter means coupled between said feedback network and said field coil for preventing voltage spikes and ripple occurring at said switching means from effecting normal operation of said second circuit means.

2. A system according to claim 1 wherein said filter means includes a Zener diode with its cathode connected to said field coil.

3. A system according to claim 2 including a resistor in series with the cathode of said Zener diode.

4. A system according to claim 3 including a capacitor connected in parallel to said Zener diode.

5. A system according to claim 1 wherein said filter means includes a low pass filter including capacitor and resistor connected in series.

6. A system according to claim 1 wherein said filter means includes transistor means with collector terminal connected to said field coil through a resistor and emitter terminal connected to a Zener diode.

7. A system according to claim 1 wherein said filter means includes a metal oxide varistor.

8. A system according to claim 7 including a resistor connected in series with said metal oxide varistor.

9. A system according to claim 8 including a capacitor connected in parallel with said metal oxide varistor.

10. An automotive battery charging system having a voltage regulator circuit with an improved feedback network comprising:

first circuit means for sensing voltage across a battery and generating a DC current in a field coil of an alternator charging system, second circuit means including switching means and a feedback network for controlling the duty cycle and frequency of current in said field coil by switching in response to the voltage of said first circuit means, filter means coupled between said feedback network and said field coil for preventing voltage spikes and ripple occurring at said switching means from effecting normal operation of said second circuit means, wherein said filter means includes transistor means with collector terminal connected to said field coil through a resistor and emitter terminal connected to a Zener diode.

* * * * *